US012637896B2

(12) United States Patent
Hulse et al.

(10) Patent No.: US 12,637,896 B2
(45) Date of Patent: May 26, 2026

(54) SYSTEMS AND METHODS FOR OPERATING A MOVABLE BARRIER OPERATOR

(71) Applicant: The Chamberlain Group LLC, Oak Brook, IL (US)

(72) Inventors: Brian William Hulse, Chicago, IL (US); Robert Roy Keller, Jr., Park Ridge, IL (US); James Scott Murray, West Chicago, IL (US); Dilip Jagjivan Patel, Bartlett, IL (US); Adam Joshua Schrems, Highland Park, IL (US)

(73) Assignee: THE CHAMBERLAIN GROUP LLC., Oak Brook, IL (US)

( * ) Notice: Subject to any disclaimer, the term of this patent is extended or adjusted under 35 U.S.C. 154(b) by 707 days.

(21) Appl. No.: 17/896,318

(22) Filed: Aug. 26, 2022

(65) Prior Publication Data

US 2023/0068611 A1 Mar. 2, 2023

Related U.S. Application Data

(60) Provisional application No. 63/237,744, filed on Aug. 27, 2021.

(51) Int. Cl.
*E05F 15/79* (2015.01)
*E05F 15/77* (2015.01)

(52) U.S. Cl.
CPC .............. *E05F 15/79* (2015.01); *E05F 15/77* (2015.01); *E05Y 2201/41* (2013.01); (Continued)

(58) Field of Classification Search
CPC ......... E05Y 2900/106; E05Y 2900/132; E05Y 2201/41; E05Y 2201/422; E05F 15/79
(Continued)

(56) References Cited

U.S. PATENT DOCUMENTS

| | | |
|---|---|---|
| 6,028,626 A | 2/2000 | Aviv |
| 6,069,655 A | 5/2000 | Seeley |

(Continued)

FOREIGN PATENT DOCUMENTS

| | | |
|---|---|---|
| CN | 104346607 | 11/2014 |
| CN | 105931406 | 9/2016 |

(Continued)

OTHER PUBLICATIONS

LifeMaster Elite Series Manual; RJO Operator Model 8500 Garage Door Opener Manual; copyright 2013; 36 pages.

(Continued)

*Primary Examiner* — Robert E Fennema
*Assistant Examiner* — Vi N Tran
(74) *Attorney, Agent, or Firm* — Dority & Manning, P.A.

(57) ABSTRACT

A method is provided for operating a movable barrier operator system in connection with a delivery. The method includes, at the movable barrier operator system, receiving a delivery open command and moving a movable barrier from a closed position to an open position. The method further includes identifying a delivery timer value based at least in part upon the delivery open command, operating a timer using the delivery timer value, and moving the movable barrier from the open position toward the closed position upon expiration of the timer.

37 Claims, 6 Drawing Sheets

(52) U.S. Cl.
CPC ..... *E05Y 2201/422* (2013.01); *E05Y 2400/32* (2013.01); *E05Y 2400/664* (2013.01); *E05Y 2400/80* (2013.01); *E05Y 2400/8515* (2024.05); *E05Y 2900/106* (2013.01); *E05Y 2900/132* (2013.01)

(58) Field of Classification Search
USPC ........................................................... 700/14
See application file for complete search history.

(56) References Cited

U.S. PATENT DOCUMENTS 6,184,926 B1 2/2001 Khosravi
6,421,462 B1 7/2002 Christian
6,594,629 B1 7/2003 Basu
6,681,032 B2 1/2004 Bortolussi
6,940,545 B1 9/2005 Ray
7,051,003 B1 5/2006 Kobata
7,113,090 B1 9/2006 Saylor
7,123,128 B2 10/2006 Mullet
7,173,516 B2 2/2007 Mullet
7,227,567 B1 6/2007 Beck
7,315,143 B2 1/2008 Mullet
7,391,907 B1 6/2008 Venetianer
7,796,780 B2 9/2010 Lipton
7,801,330 B2 9/2010 Zhang
7,847,820 B2 12/2010 Vallone
7,999,857 B2 8/2011 Bunn
8,139,098 B2 3/2012 Carter
8,564,661 B2 10/2013 Lipton
8,587,404 B2 11/2013 Laird
8,660,249 B2 2/2014 Rondeau
8,949,889 B1 2/2015 Erdmann
9,105,053 B2 8/2015 Cao
9,122,254 B2 9/2015 Cate
9,141,099 B2 9/2015 Cate
9,176,608 B1 11/2015 Baldwin
9,208,675 B2 12/2015 Gang
9,224,044 B1 12/2015 Laska
9,230,560 B2 1/2016 Ehsani
9,313,312 B2 4/2016 Merrow
9,373,076 B1 6/2016 Appelman
9,479,354 B2 10/2016 Yamanishi
9,740,940 B2 8/2017 Chattopadhyay
9,756,233 B2 9/2017 Lee
9,805,266 B2 10/2017 Zhang
10,073,428 B2 9/2018 Bruhn
10,102,495 B1 10/2018 Zhang
10,354,467 B2* 7/2019 Baker ................ G07C 9/00309
10,713,869 B2 7/2020 Morris
10,769,442 B1 9/2020 Ding
10,783,479 B2* 9/2020 Hall ................... G07C 9/00182
10,846,956 B2 11/2020 Cate
10,861,265 B1 12/2020 Merkley
10,952,016 B2 3/2021 Shinar
11,055,942 B2 7/2021 Coates
11,295,139 B2 4/2022 Khadloya
11,562,610 B2 1/2023 Alamin
11,574,512 B2 2/2023 Morris
2003/0137590 A1 7/2003 Barnes
2003/0163289 A1 8/2003 Whelan
2005/0267605 A1 12/2005 Lee
2006/0170769 A1 8/2006 Zhou
2006/0190419 A1 8/2006 Bunn
2006/0202815 A1* 9/2006 John ...................... G08B 21/14 340/5.71
2007/0002141 A1 1/2007 Lipton
2007/0098220 A1 5/2007 Pilu
2008/0002856 A1 1/2008 Ma
2008/0012515 A1* 1/2008 Murray ............. G07C 9/00174 318/282
2009/0041297 A1 2/2009 Zhang
2009/0315996 A1 12/2009 Guler
2012/0020524 A1 1/2012 Ishikawa
2012/0026328 A1 2/2012 Sethna
2013/0235195 A1 9/2013 Fujisaki
2013/0250050 A1 9/2013 Kanaujia
2013/0275138 A1 10/2013 Gruber
2014/0222436 A1 8/2014 Binder
2014/0347475 A1 11/2014 Divakaran
2015/0149321 A1* 5/2015 Salameh ............ G06Q 30/0613 705/26.41
2015/0317596 A1 11/2015 Hejazi
2015/0371520 A1 12/2015 Delean
2016/0140391 A1 5/2016 Kim
2016/0148154 A1 5/2016 Tibbs
2016/0180195 A1 6/2016 Martinson
2016/0180667 A1 6/2016 Bunker
2016/0217326 A1 7/2016 Hosoi
2017/0011340 A1 1/2017 Gabbai
2017/0053191 A1 2/2017 Koyama
2017/0147153 A1 5/2017 Gu
2017/0213080 A1 7/2017 Nathan
2017/0213081 A1 7/2017 Nathan
2018/0031700 A1 2/2018 Horishita
2018/0129885 A1 5/2018 Potter
2018/0165637 A1 6/2018 Romero
2018/0285647 A1 10/2018 Chen
2018/0295428 A1 10/2018 Bi
2018/0342329 A1 11/2018 Rufo
2019/0043290 A1 2/2019 Morris
2019/0051067 A1* 2/2019 Witkowski ......... G07C 9/00309
2019/0213817 A1* 7/2019 Wechsler ........... G07C 9/00563
2019/0244448 A1 8/2019 Alamin
2019/0258866 A1 8/2019 Khadloya
2019/0303684 A1* 10/2019 Khadloya .......... G07C 9/00896
2020/0219340 A1* 7/2020 Geerlings .......... G07C 9/00182
2020/0312073 A1* 10/2020 Ivarson ................ G06K 7/1417
2021/0189787 A1 6/2021 Dreyer
2021/0301582 A1* 9/2021 Walddörfer .......... G06Q 10/083

FOREIGN PATENT DOCUMENTS

| | | |
|---|---|---|
| CN | 106372576 | 2/2017 |
| CN | 206712917 | 12/2017 |
| CN | 107609512 | 1/2018 |
| CN | 108540762 | 9/2018 |
| CN | 108734300 | 11/2018 |
| EP | 0772169 | 5/1997 |
| JP | 2007315965 | 12/2007 |

OTHER PUBLICATIONS

Machine Translation of CN104346607; Nov. 6, 2014; University of Shanghai.
Machine Translation of CN105931406; Sep. 7, 2016; Fu Shaoming.
Machine Translation of CN106372576; Feb. 1, 2017; University Nanjing Posts.
Machine Translation of CN107609512; Jan. 19, 2018; Shanghai Minsh NE.
Machine Translation of CN108540762; Sep. 14, 2018; Wuhan Mofei Intel.
Machine Translation of CN108734300; Nov. 2, 2018; Intel Corp.
Machine Translation of CN206712917; Dec. 5, 2017; Xinjiang Hezhong.
Machine Translation of JP2007315965; Dec. 6, 2007; Sanyo Electric Co.
U.S. Appl. No. 17/741,620; Application as Filed Dated May 11, 2022; 93 Pages.

* cited by examiner

SYSTEMS AND METHODS FOR OPERATING A MOVABLE BARRIER OPERATOR

RELATED APPLICATION(S)

This application claims the benefit of U.S. Provisional Application No. 63/237,744, filed Aug. 27, 2021, entitled Systems and Methods For Operating a Movable Barrier Operator, which is incorporated by reference in its entirety herein.

TECHNICAL FIELD

This disclosure relates generally to operating a movable barrier operator.

BACKGROUND

Movable barrier operators are known, such as garage door operators and gate operators, which move movable barriers such as garage doors, gates, and rolling shutters. Many residences have at least one garage door. The garage door is generally coupled to a garage door operator that enables a user to remotely open and close the garage door using a remote control. Different remote controls are known, such as a RF transmitter that communicates directly with the garage door operator using RF signals, and user devices such as smartphones that communicate a state change request to a garage door operator via the internet and a server computer. However, despite such remote controls the garage door may be left opened unbeknownst to the resident user.

BRIEF DESCRIPTION OF THE DRAWINGS

Disclosed herein are embodiments of systems, apparatuses and methods pertaining to operating a movable barrier operator. This description includes drawings, wherein.

Figure 1:
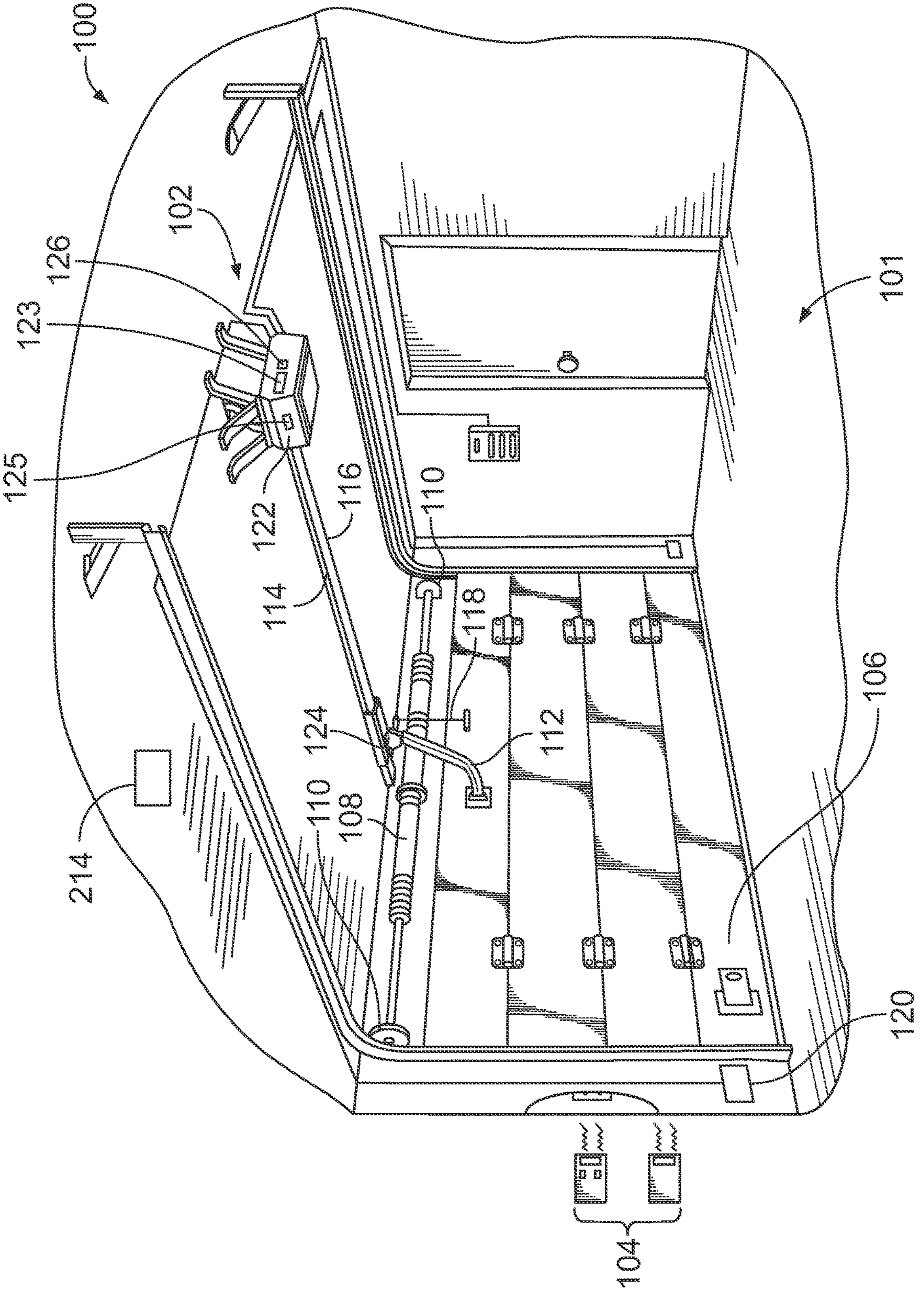
FIG. 1 is a view of an example movable barrier operator system for operating a garage door.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for facilitating operation of a movable barrier operator associated with a secured area such as a garage. In some embodiments, the movable barrier operator system includes a motor, communication circuitry, and a processor operably coupled to the motor and communication circuitry. The motor is operable to move a movable barrier between open and closed positions. The communication circuitry may receive a delivery open command including a first state change command and a delivery timer value. The delivery timer value is a period of time or duration during which access to the area is enabled. The delivery open command may be communicated to the movable barrier operator from a remote computer, such as a server computer, via one or more networks such as the internet. In some embodiments, the processor activates the motor to move the movable barrier between closed and open positions to enable access to the area in response to the receipt of the delivery open command. The open position may be a fully open position or a partially open position, such as ten inches from the closed position to permit a delivery associate to slide a package under the movable barrier. In response to the processor causing operation of the motor to open the movable barrier, the processor may transmit a delivery open response to a remote computer such as the server computer that communicated the delivery open command. In some embodiments, the processor runs a timer relative to a particular value e.g. decrementing from (i.e., counting down) or incrementing to (i.e., counting up) the delivery timer value. The processor may determine whether a delivery close command is received by the communication circuitry. The delivery close command may be communicated to the movable barrier operator system from the server computer, a wall mount control panel, a handheld transmitter, or an in-vehicle device. In some embodiments, the processor activates the motor to move the movable barrier from the open position to the closed position to disable access to the area in response to the delivery timer counting down from a particular value to a zero value and the delivery close command having not been received. The movable barrier operator system may thereby close the movable barrier after the expiration of the delivery timer even if the user (e.g., a delivery associate) who initiated the delivery open command forgets to close the movable barrier or is unable to close the movable barrier. Inability to close the movable barrier may occur if, for example, the communication circuitry communicates via a local Wi-Fi® network and the network is interrupted due to interference or a modem or access point being offline which inhibits the server computer from communicating the delivery close command to the movable barrier operator system.

In some embodiments, a method for operating a movable barrier operator system is provided that includes receiving, at communication circuitry of the movable barrier operator system, a delivery open command including a first state change command and a delivery timer value. The method includes activating, by a processor of the movable barrier operator system, a motor to move a movable barrier between closed and open positions in response to the receipt of the delivery open command. In some embodiments, the delivery timer value is a period or duration of time during which access to the area is enabled. The method includes transmitting, by the communication circuitry, a delivery open response in response to the processor causing the motor to move the movable barrier. The method includes running a timer for incrementing or decrementing time, by the processor, to or from the delivery timer value. The method includes determining, by the processor, whether a delivery close command including a second instruction to disable access to the area is received. The method includes activating, by the processor, the motor to move the movable barrier between the open position and the closed position in response to the delivery timer reaching a zero or particular value and the delivery close command having not been received.

Referring now to FIG. 1, an example movable barrier operator system 100 is provided for operating a movable barrier such as a garage door 106 and limiting access to a secured area such as a garage 101. In one embodiment, the movable operator system 100 includes a garage door operator 102 and one or more remote controls such as a transmitter 104. The one or more remote controls may include, for example, a user device such as a smartphone, an in-vehicle device such as a head unit or infotainment system coupled to an in-vehicle transmitter, a keypad, a wall control, a visor-mounted remote control, and/or a handheld transmitter such as a key fob. The garage door operator 102 includes an electric motor 122, communication circuitry 123, and a control circuit (including a processor 125 and a memory 126). The processor 125 may include, for example, a microprocessor, a system-on-a-chip, an application specific integrated circuit (ASIC), and/or a field programmable gate array (FPGA). The memory 126 may include, for example, an electrical charge-based storage media such as EEPROM or RAM, or other non-transitory computer readable media. In some embodiments, the garage door operator includes a rail 116 and transmission member 114 such as a chain, belt, or screw driven by the motor 122 relative to the rail 116. The electric motor 122 is operable to move the garage door 106 between open and closed positions. For example, a trolley 124 is coupled to the transmission member 114 as well as an arm 112 that is attached to the garage door 106. The motor 122 shifts the trolley 124 back-and-forth along the rail 116 to lift and lower the garage door 106. A release mechanism 118 is coupled to the trolley 124 to allow the garage door 106 to be disconnected from the garage door operator 102 for manual operation e.g. during a power failure.

The garage door operator system 100 includes a pulley and cable mechanism 110 that is attached to the garage door 106. The pulley and cable mechanism 110 includes a pulley and a corresponding cable on each side of the garage door 106. The pulley and cable mechanism 110 couples to a counterbalance such as a torsion spring 108 that assists in lifting the weight of the garage door 106 and enables the garage door operator 102 to open or close the garage door 106 via movement of the trolley 124. In some embodiments, an optical sensor such as a photo eye system 120 senses an object and/or a human who may be in the way of the garage door 106 as the garage door 106 closes.

Figure 2A:
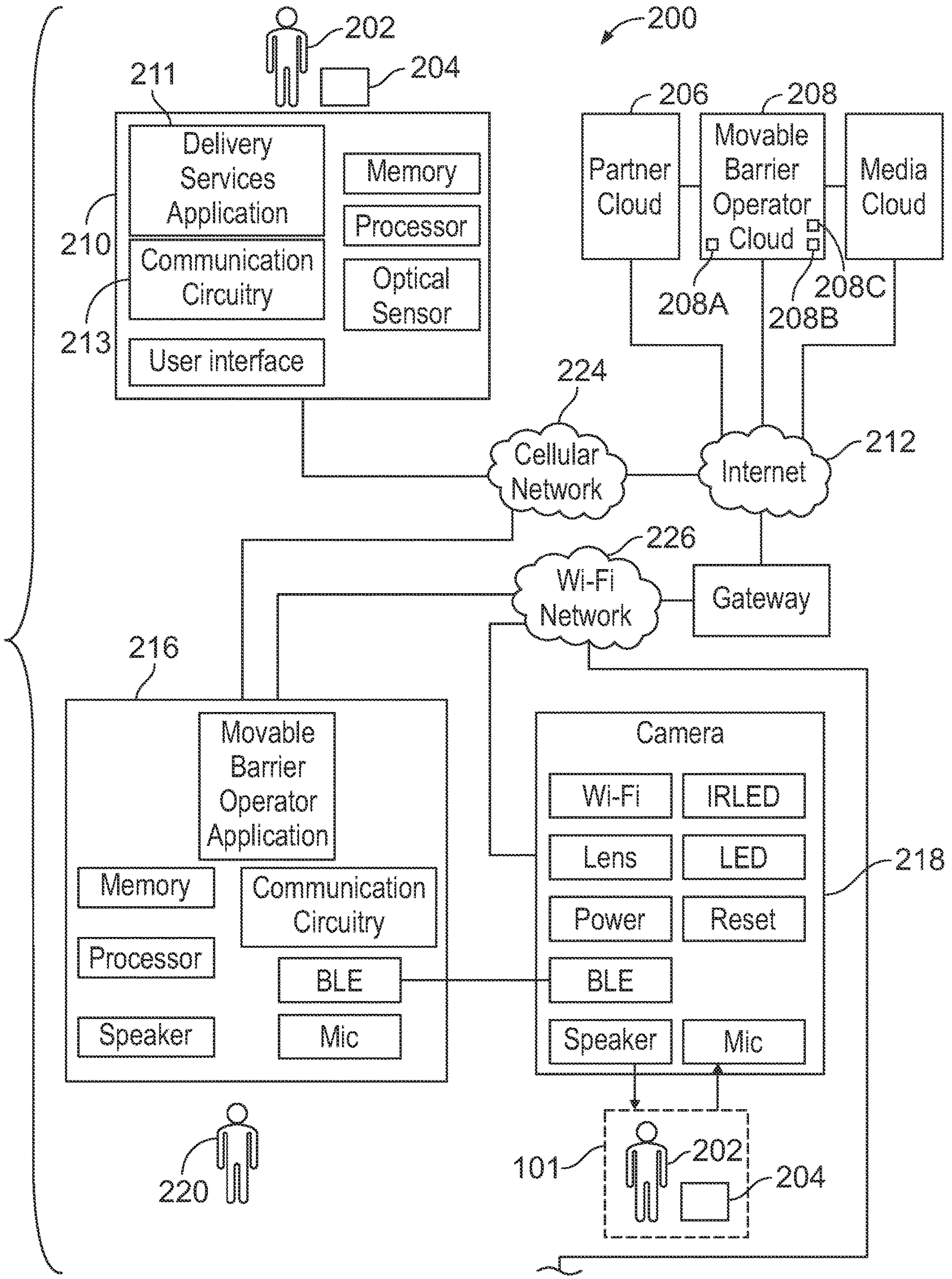
FIGS. 2A-2B are a block diagram of an example delivery services system for facilitating delivery of a package to a garage.
Figure 2B:
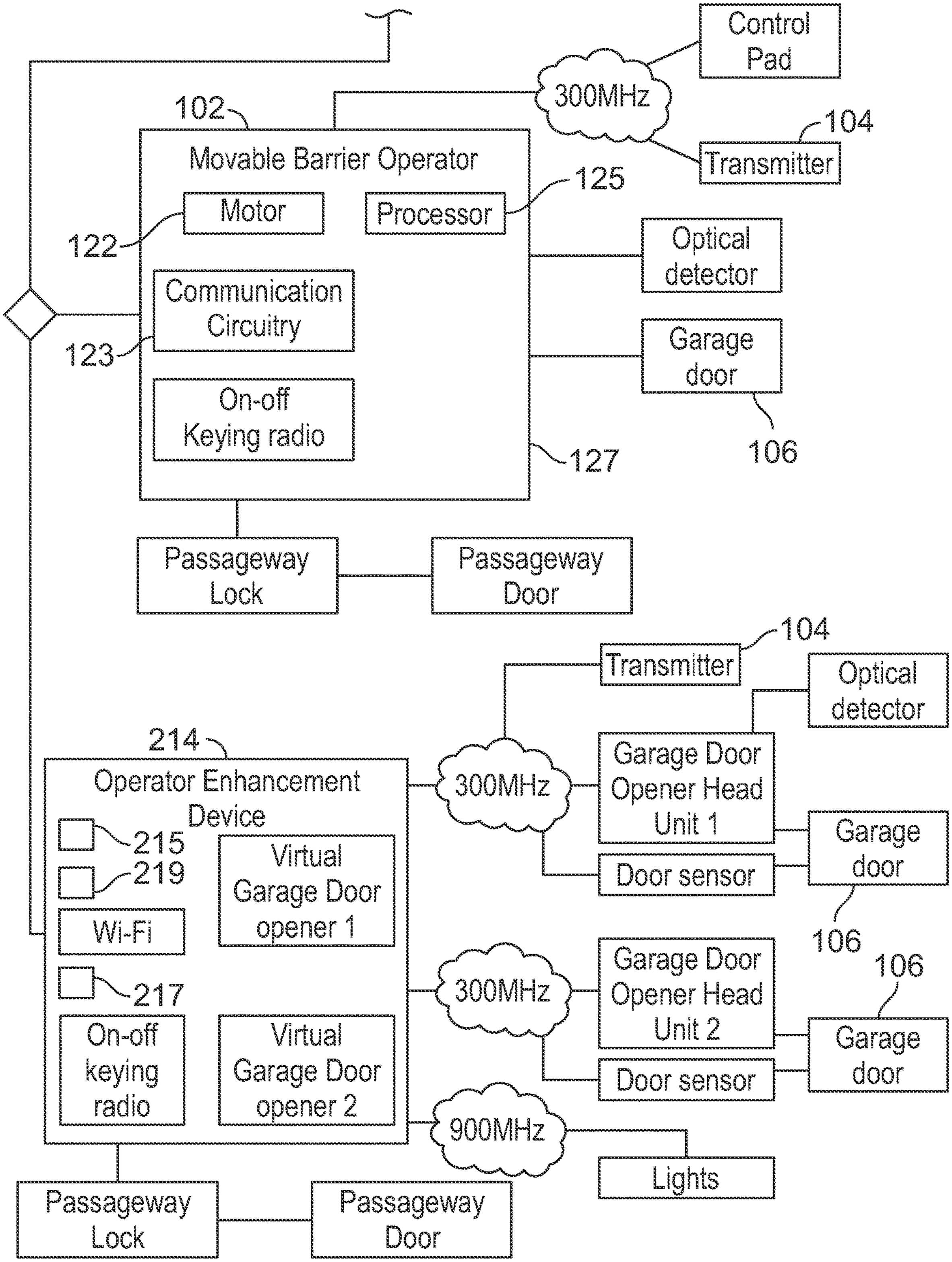

Referring now to FIGS. 2A-2B, an example block diagram is shown of a delivery services system 200 for facilitating delivery of a package 204 to a garage 222. A delivery agent 202 is assigned to make a delivery of the package 204. The delivery agent 202 may be, for example, a human delivery associate, an unmanned aerial vehicle (e.g., a drone), and/or a land-based robot. The delivery agent 202 may be associated with an electronic device 210 (e.g., a smartphone, a smartwatch, a laptop, a tablet computer, an in-vehicle device, to name a few) and used by the delivery agent 202 to deliver the package 204, the electronic device 210 configured for opening a garage door 106 to facilitate placement of the package 204 inside the garage 222 and closing the garage door 106 after completing the delivery. In an illustrative non-limiting example, when the delivery agent 202 is at a delivery location, the delivery agent 202 sends a request to open the garage door 106 via a delivery services application 211 installed in the electronic device 210. Communication circuitry 213 of the electronic device 210 couples to the Internet 212 via a cellular network 224 to deliver the request to a partner cloud 206. In some embodiments, the partner cloud 206 includes one or more computers, such as server computers, associated with an e-commerce business.

The partner cloud 206 communicates a delivery open request to a movable barrier operator cloud 208 via the Internet 212. The movable barrier operator cloud 208 may include one or more computers, such as server computers, associated with a manufacturer of the movable barrier operator system 100. The one or more computers of the movable barrier operator cloud 208 may include a memory 208A, communication processor 208B, and a processor 208C. The movable barrier operator cloud 208 may transmit a delivery open command to the garage door operator 102 via the Internet 212. The garage door operator 102 includes the motor 122 and the processor 125 within a housing 127. In response to receiving the delivery open command, the processor 125 may determine the position of the garage door 106. If the garage door 106 is in the closed position, the processor 125 activates the motor 122 to move the garage door 106 to the open position to enable access to the area secured by the movable barrier. In response to activating the motor 122, the processor 125 transmits a delivery open response to the movable barrier operator cloud 208 confirming that the garage door 106 was opened such that access to the garage has been enabled. In some embodiments, the movable barrier operator system 100 includes a movable barrier operator such as the garage door operator 102 and a gateway such as an operator enhancement device 214. Upon receiving a state change command from the movable barrier operator cloud 208 via the Internet 212, the operator enhancement device 214 transmits a radio frequency signal to the garage door operator 102 to cause the garage door operator 102 to change the position of the garage door 106. The operator enhancement device 214 includes a door position sensor mounted to the garage door 106 that permits a processor of the operator enhancement device 214 to determine the state of the garage door 106, e.g., closed, open, moving. The operator enhancement device 214 communicates the state of the garage door 106 to the movable barrier operator cloud 208. The movable barrier operator enhancement device 214 may be, for example, an operator enhancement device as disclosed in U.S. Pat. No. 9,122,254, issued on Sep. 1, 2015. U.S. Pat. No. 9,122,254 is hereby incorporated by reference in its entirety herein.

In some embodiments, the delivery services system 200 includes a user electronic device 216 associated with a user 220 (e.g., a resident user) communicatively coupled to the movable barrier operator 102 via a local communication network (e.g., a Wi-Fi network 226), the internet 212, and the movable barrier operator cloud 208. A movable barrier operator application may be installed on the user electronic device 216 enabling the user 220 to control the garage door operator 102 and the position of the garage door 106. In some embodiments, the delivery services system 200 includes one or more cameras 218 that may be integrated with the movable barrier operator system 100 or separately installed in the garage 101. The camera 218 captures images, such as a video, of the secured area. In some embodiments, the camera 218 communicates image data to the garage door opener 102, the partner cloud 206, the movable barrier operator cloud 208, and/or a media cloud 209. At least one of the camera 218, garage door opener 102, partner cloud 206, movable barrier operator cloud 208, and the media cloud 209 may process the image data to determine that the garage door 106 is opening, determine that the delivery agent 202 is currently dropping off the package 204 inside the garage 222, monitor movements of the delivery agent 202, identify the location of the package 204, determine that the delivery agent 202 has exited the garage 222, and/or determine the garage door 106 has closed. In one embodiment, the image data is processed to determine whether to cause the garage door operator 102 to automatically close the garage door 106.

After dropping off the package 204 inside the garage 102, the delivery agent 202 may send a request to close the garage door 106 via the delivery services application 211 installed in the electronic device 210. The communication circuitry of the electronic device 210 couples to the Internet 212 via the cellular network 224 to deliver the request to the partner cloud 206. The partner cloud 206 communicates with the movable barrier operator cloud 208, causing the movable barrier operator cloud 208 to send a delivery close command including a state change command to effect closing of the garage door 106 by the garage door opener 102. In some embodiments, the delivery agent 202 may press an external "close barrier" button installed outside of the garage 102 to cause the movable barrier operator 102 to activate the motor 122 to close the garage door 106 and bypass the need for the delivery agent 202 to send a request to close the garage door 106 using the delivery services application.

Secured Area Left Exposed after Delivery Agent Completes Delivery

However, there may be times where the garage door 106 is left in the open position after the delivery agent 202 completes the delivery. The garage door 106 may be left in the open position when the delivery agent 202 forgets to send a request to close the garage door 106, due to a network communication failure, and/or if a system database server error may have occurred, as a few examples. In some embodiments, the network communication failure may occur if the partner cloud 206 is inoperative or otherwise experiences an error/fault, the movable barrier operator cloud 208 is inoperative or otherwise experiences an error/fault, the movable barrier operator 102 is offline (e.g., not currently connected to a home Wi-Fi router), or the power to the garage door operator 102 is disconnected e.g. temporarily interrupted.

Delivery Timer-to-Close

Figure 3:
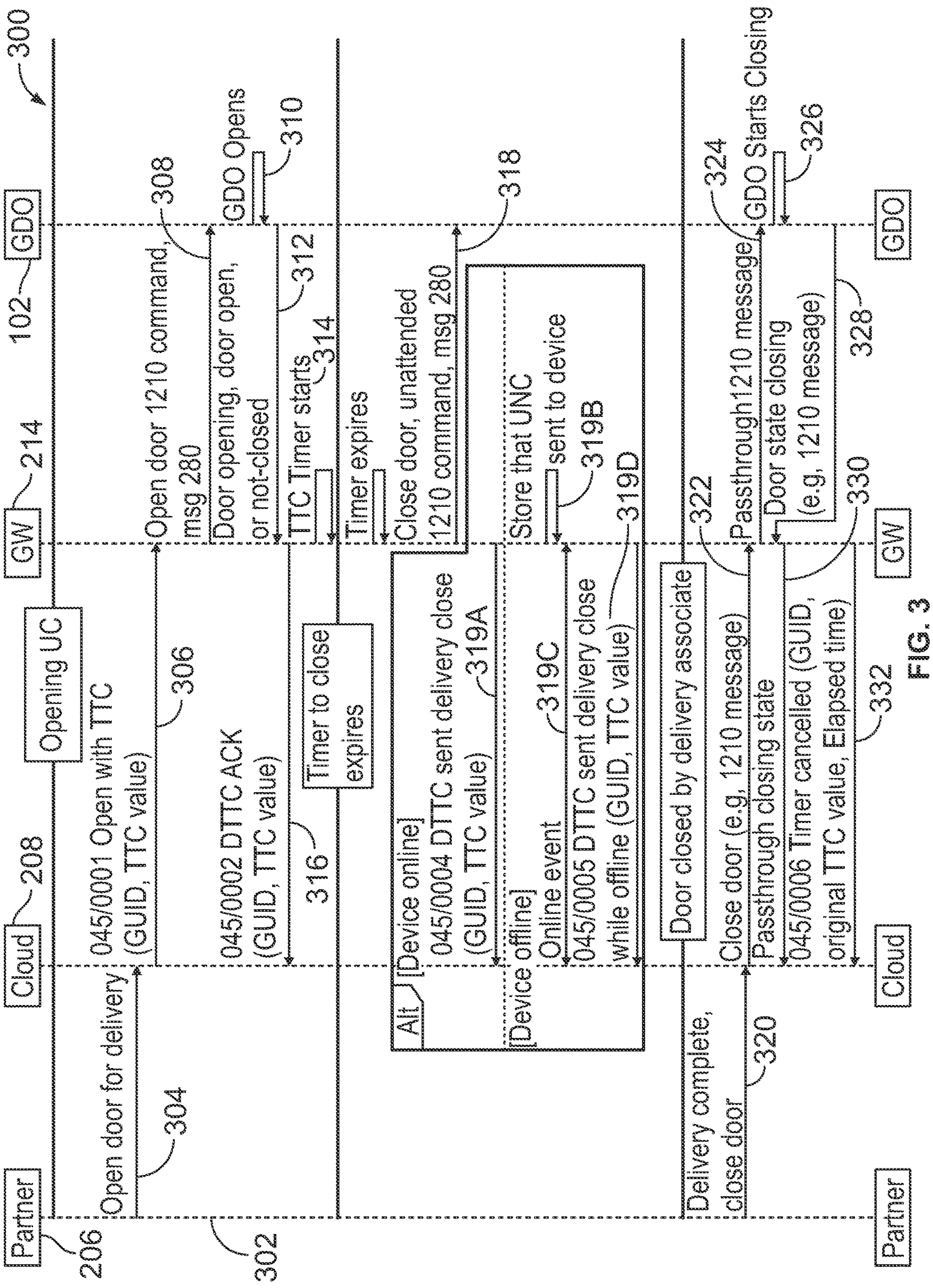
FIG. 3 shows an example communication flow diagram of a method for implementing a timer-to-close of a garage door operator after a delivery of a package.
Figure 4:
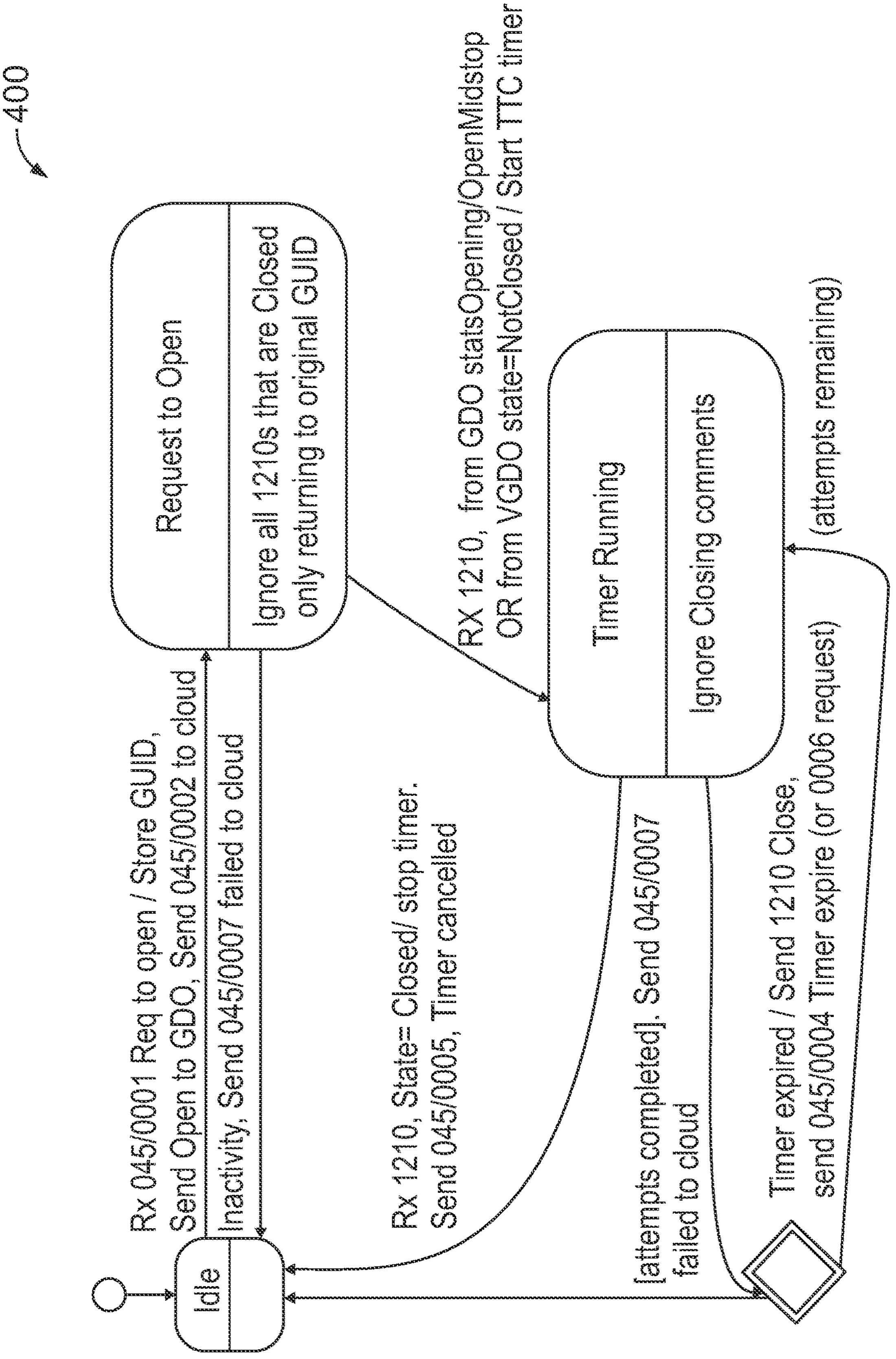
FIG. 4 is an example state machine representation of the method of FIG. 3.

FIG. 3 shows an example communication flow diagram 300 for implementing a delivery timer-to-close function or feature of a garage door operator to close a garage door without user intervention after a delivery of a package and regardless of whether a non-delivery timer-to-close function or feature is active. FIG. 4 is an example state machine representation associated with FIG. 3. For example, when the garage door 106 is left opened or the secured area left exposed after the delivery agent 202 completes the delivery, the movable barrier operator 102 may use a delivery timer as a backup to close the open garage door 106. More specifically, after the garage door 106 is opened, counting of a delivery timer up to the delivery timer value or down therefrom to zero may be initiated. In some embodiments, the delivery timer value may be set by the movable barrier operator 102 to a value longer than a period of time the delivery agent 202 needs to keep the garage door 106 open. For example, the delivery timer value may be 5 minutes, 10 minutes, or an average period of time a delivery agent generally takes to complete the delivery/drop-off of the package 204 as a few examples. In some embodiments, the package 204 may include products, grocery or perishable items, pharmaceutical items, furniture, etc.

For example, when the delivery agent 202 arrives at a delivery location (e.g., the garage 101), the delivery agent 202, using a hand-held internet connected device (e.g., smartphone, and/or any portable electronic device) and/or an in-vehicle device, may send an open request to open the garage door 106. In some embodiments, at 302, the open request is received by partner cloud 206. The partner cloud 206 may, at 304, send a delivery open request to the movable barrier operator cloud 208 to enable access by the delivery agent 202 to the garage 101. In some embodiments, the movable barrier operator cloud 208 determines whether the delivery open request is authorized to effect a change of the garage door 106 based on a correspondence between identifying information of the delivery open request and a user account associated with the garage door operator 102. The determination may include confirming that the movable barrier operator system 100 is configured to utilize a delivery timer value based upon user account information. For example, a user may have to enable delivery access and/or enable a delivery timer-to-close before the movable barrier operator cloud 208 facilitates operation of the movable barrier operator system 100 in response to requests from the partner cloud 206.

The movable barrier operator cloud 208 may, at 306, transmit a delivery open command to the movable barrier operator system 100 in response to the receipt of the delivery open request. In the embodiment of FIG. 3, the operator enhancement device 214 (indicated as gateway 'GW') communicates with the movable barrier operator cloud 208 and sends control signals to the garage door operator 102 via wired or wireless approaches (e.g., RF signals in the 300-1000 MHz range). In other embodiments, the garage door opener 102 is configured to communicate directly with the movable barrier operator cloud 208 without an operator enhancement device 214.

The delivery open command includes a delivery timer value and a first state change command. For example, the delivery timer value may be a portion of the payload of the delivery open command. A processor of the movable barrier operator system, such as a processor 215 of the operator enhancement device 214, stores the delivery timer value in a non-transitory computer readable memory of the movable barrier operator system, such as a memory 217 of the operator enhancement device 214. The delivery open command may also include an identifier of the movable barrier operator system 100, such as a globally unique identifier (GUID) of the operator enhancement device 214.

The delivery timer value may be predetermined based on the type of delivery and/or items to be delivered. For example, the type of delivery may include packages of hard/soft goods and/or perishables such as groceries. By one approach, a delivery timer value associated with a package delivery of hard/soft goods may be less than a delivery timer value associated with a grocery delivery since the package delivery is generally quick (e.g., door opens, place package, and close door) compared to the grocery delivery, which generally takes longer (e.g., multiple trips to the delivery vehicle to retrieve additional items, locating a temperature-controlled container such as a cooler or refrigerator, and placing the perishable item(s) in the aforementioned container). By one approach, the delivery timer value associated with the package delivery may be 2 minutes. By another approach, the delivery timer value associated with the grocery delivery may be 5 minutes. The delivery timer value corresponds to a period of time during which the access to the garage 101 is enabled. In some embodiments, at 316, the processor 125 or 215 sends an acknowledgment of a receipt of the delivery open command to the movable barrier operator cloud 208. The acknowledgement may include the delivery timer value and the GUID of the garage door opener 106.

The movable barrier operator cloud 208 may store in a memory thereof the current state of the garage door 106. The movable barrier operator cloud 208 may include the first state change command in the delivery open command if the requested state of the garage door 106 (e.g., open) is different than the current state of the garage door 102 (e.g., closed).

In the embodiment of FIG. 3, the movable barrier operator cloud 208 communicates the delivery open command to an operator enhancement device 214. At operation 308, the operator enhancement device 214 transmits a control signal (e.g., via a radio frequency signal) to the garage door operator 102. The garage door operator 102 opens the garage door 106 at operation 310 to enable the delivery agent to access the garage 101. At 312, the garage door operator 102 sends a message to the operator enhancement device 214 indicating that the garage door 106 is opening, has opened, and/or is not closed.

At 314, a processor of the movable barrier operator system 102, such as the processor 215 of the operator enhancement device 214, may initiate running of (e.g. incrementing or decrementing) the delivery timer based on the delivery timer value that was previously communicated at 306 and/or 308. In some embodiments, the processor of the movable barrier operator system 100 determines whether a delivery close command including a second instruction to disable access (e.g. close the barrier) to the secured area is received by communication circuitry of the movable barrier operator system 100, such as communication circuitry of the operator enhancement device 214. At 318, the movable barrier operator system 100 closes the garage door 106 such as by the operator enhancement device 214 transmitting a control signal to the movable barrier operator 102 which causes the movable barrier operator 102 to close the garage door 106 in response to the delivery timer expiring (e.g. decrementing and reaching a zero value) and the delivery close command has not been received.

In some embodiments, the movable barrier operator system 100 includes a memory, such as the memory 217 of the operator enhancement device 214, having a delivery timer-to-close memory location. A processor of the movable barrier operator system 100, such as the processor 215 of the operator enhancement device 214, may store the delivery timer value in the delivery timer-to-close memory location in response to the receipt of the delivery open command by communication circuitry of the movable barrier operator system such as communication circuitry 219 of the operator enhancement device 214. The processor of the movable barrier operator system 100 may stop running the delivery timer relative to the delivery timer value in the delivery timer-to-close memory location in response to a receipt of the delivery close command. The processor 125 may store a zero value in the delivery timer-to-close memory location for the delivery timer value. The zero value effectively disables or cancels the delivery timer. In some embodiments, the delivery close command may be initiated/caused by a delivery agent 202 or a homeowner.

If the movable barrier operator system 100 is able to communicate with the movable barrier operator cloud 208, e.g., the Wi-Fi connection is operational, at step 319A the movable barrier operator system 100 sends a communication to the movable barrier operator cloud 208 indicating the garage door 106 has been closed. For example, the operator enhancement device 214 sends a close confirmation to the movable barrier operator cloud 208 including the GUID of the operator enhancement device 214 and the timer-to-close value.

If the movable barrier operator system 100 is unable to communicate with the movable barrier operator cloud 208, e.g., the Wi-Fi connection is inoperable, the movable barrier operator system 100 delays sending the communication to the movable barrier operator cloud 208 until the movable barrier operator system 100 is online. For example, the operator enhancement device 214 stores at operation 319B data indicating the operator enhancement device 214 transmitted the state change command to the garage door opener 102 until the processor 215 of the operator enhancement device 214 determines the operator enhancement device 214 is online upon detecting an online event 319C, e.g., receiving a message from the movable barrier operator cloud 208. At operation 319D, the operator enhancement device 214 sends a communication to the movable barrier operator cloud 208 confirming closing of the garage door 106.

In some embodiments, when the delivery agent 202 has completed delivery, the delivery agent 202 may before expiration of the timer send a delivery close request to the partner cloud 206 to close the garage door 106. The partner cloud 206 may, at 320, send a delivery close request to the movable barrier operator 208 to disable access to the secured area. The movable barrier operator 208 may, at 322, transmit a delivery close command to the movable barrier operator system 100 in response to the receipt of the delivery close request. In one embodiment, the operator enhancement device 214 receives the delivery close command and transmits 324 a state change command to the garage door operator 102. The garage door operator 102 starts to close 326 the garage door 102 and the door position sensor of the operator enhancement device 214 outputs or otherwise communicates 328 sensor data to the operator enhancement device 214 indicating the garage door 102 is closing. The operator enhancement device 214 communicates 330 a message to the movable barrier operator cloud 208 indicating the garage door 102 is closing. The operator enhancement device 214 also communicates 332 a message indicating the timer-to-close delivery timer has been canceled, the message including the GUID of the operator enhancement device, the original timer-to-close value, and the elapsed time.

Inhibiting Unintentional Closure of the Garage Door while Delivery is Still Ongoing In some embodiments, the movable barrier operator 102 may have a barrier timer value. The barrier timer value corresponds to an internal (non-delivery) timer-to-close feature that is different and distinct from the delivery timer-to-close feature and which the resident user may set to cause the movable barrier operator 102 to close the garage door 106 after a predetermined time period if the resident user fails to close the garage door 106. In some embodiments, the barrier timer value is 1 minute, 5 minutes, 10 minutes, and/or any time between 1 to 99 minutes. The barrier timer value may initially be a default value set by the manufacturer of the garage door operator 102 that may be changed by a user. For example, when the resident user forgets to close the garage door 106, the processor of the movable barrier operator system 100 may initiate a timer with the barrier timer value and increment to or decrement from the barrier timer value until the particular timer value has elapsed and the movable barrier operator system 100 automatically closes the garage door 102.

However, in some instances the barrier timer value may be less than the delivery timer value. If the garage door operator 102 were to automatically close the garage door 106 upon the barrier timer value decrementing to zero, the garage door opener 102 may close the garage door 106 with the delivery agent 202 still inside the garage or outside of the garage (e.g., unable to delivery more packages to the garage). To inhibit unintentional closure of the garage door 106 while the delivery is still ongoing, the processor of the movable barrier operator system 100 (e.g., processor 215 of the operator enhancement device 214) may adjust the barrier timer value or otherwise temporarily disable, deactivate, or supersede the barrier timer such that the movable barrier operator 102 will not close the garage door 106 after elapse of the barrier timer value during a delivery. For example, the processor may pause the decrementing of the barrier timer value in response to the movable barrier operator system 100 receiving the delivery open command. In response to the delivery agent 202 closing the garage door 102, the processor of the movable barrier operator system 100 may unpause the decrementing of the barrier timer value and reset the barrier timer value to be utilized with a subsequent door opening operation.

In some embodiments, the delivery open command may include a second instruction to change a default barrier timer value when the default barrier timer value is less than the delivery timer value. For example, the default barrier timer value corresponds to a default period or duration of time that an access to the garage 101 is enabled. In another example, the processor of the movable barrier operator system 100 may change the default barrier timer value stored in the memory of the movable barrier operator system 100 to a modified barrier timer value such that the garage door operator 102 will not close the garage door 106 based on the default barrier timer value during a delivery. The modified barrier timer value may be longer than the delivery timer value. In such an example, the processor of the movable barrier operator system 100 may receive a reset barrier timer command to change the modified barrier timer value back to the default barrier timer value when the delivery has been completed. The default barrier timer value may correspond to a predetermined period of time set by a user or by a manufacturer of the operator enhancement device 214 and/or the garage door opener 102.

In some embodiments, the barrier timer value and the delivery timer value are separate features of the movable barrier operator system 100 each having independent parameters and configurations. For example, the movable barrier operator system 100 may utilize the delivery timer value to automatically close the garage door 102 in response to the movable barrier operator system 100 receiving a delivery open command. The movable barrier operator system 100 utilizes the barrier timer value in response to any other open commands, such as from a transmitter 104, a wall mount control, an exterior keypad, and/or a smartphone of a homeowner.

In some embodiments, the movable barrier operator system 100 may close the garage door 106 when the partner cloud 206 determines that a location of the electronic device 210 of the delivery agent 202 is at a threshold distance from a location associated with the movable barrier operator 102, such as by using Global Positioning System (GPS) data.

Regarding FIG. 4, an example state machine diagram 400 is provided that is representative of the method 300 discussed above.

Figure 5:
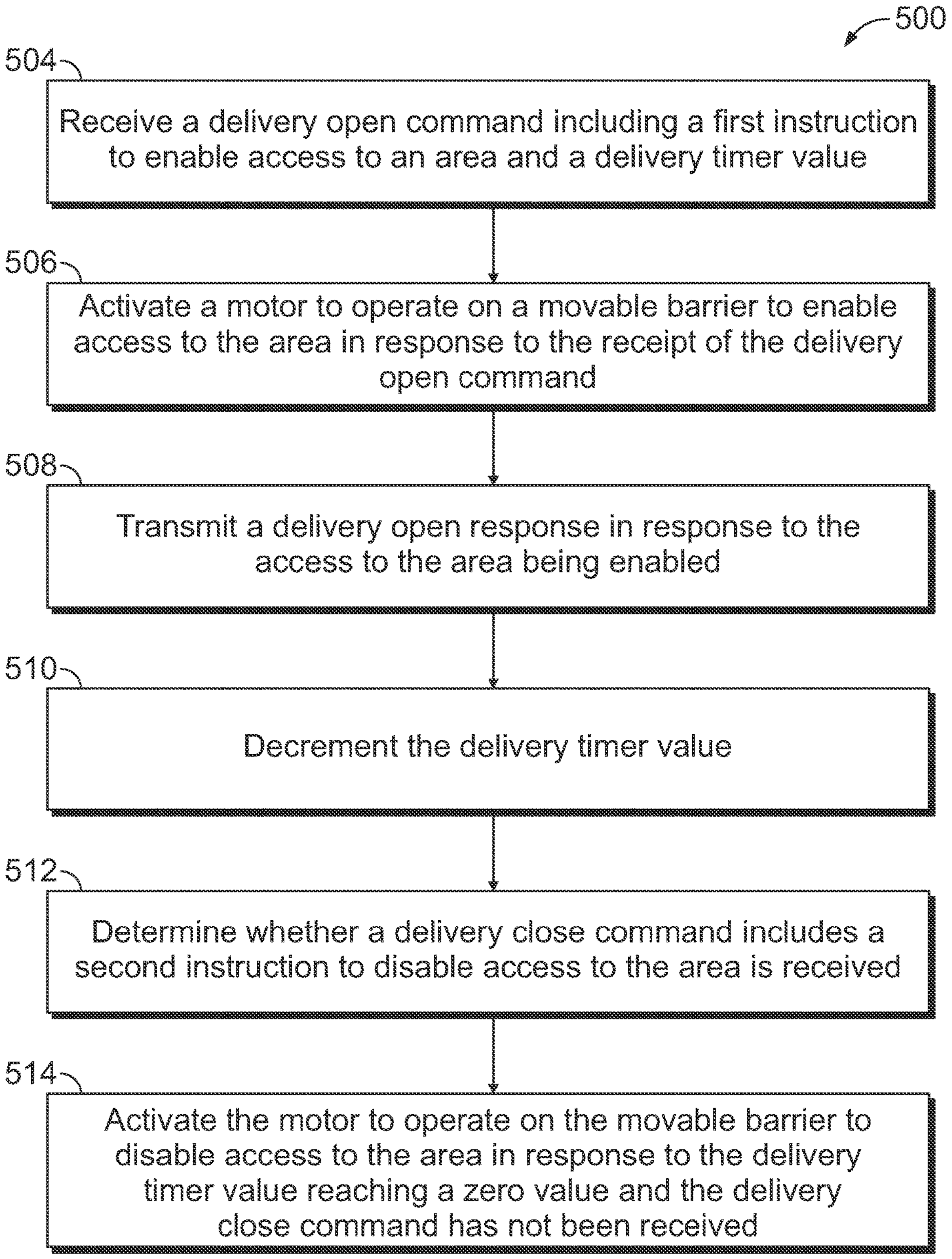
FIG. 5 shows a flow diagram of an example method of operating a movable barrier in accordance with some embodiments.

FIG. 5 is a flow diagram of an example method 500 of operating a movable barrier operator system in accordance with some embodiments. The method 500 includes, at step 504, receiving, at communication circuitry of the movable barrier operator system, a delivery open command including a first state change command and a delivery timer value. The method 500 includes, at step 506, activating, by a processor of the movable barrier operator system, a motor of the movable barrier operator system 100 to open a movable barrier in response to the receipt of the delivery open command. In some embodiments, the delivery timer value is a period of time an access to an area associated with the movable barrier is enabled. The method 500 includes, at step 508, transmitting, by the processor of the movable barrier operator system, a delivery open response in response to the movable barrier operator system opening the movable barrier. The method 500 includes, at step 510, running a timer e.g. incrementing or decrementing time, by the processor, relative to the delivery timer value. The method 500 includes, at step 512, determining, by the processor, whether a delivery close command including a second instruction to close the movable barrier is received. The method 500 includes, at step 514, activating, by the processor, the motor to close the movable barrier in response to elapse of the timer relative to the delivery timer value e.g., the delivery timer reaching a zero value and the delivery close command has not been received.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A method for operating a movable barrier operator system in connection with a delivery, the method comprising:

at the movable barrier operator system:
- receiving a delivery open command;
- moving a movable barrier from a closed position to an open position in response to receiving the delivery open command;
- identifying a delivery timer value included as part of a payload of the delivery open command;
- operating a timer using the delivery timer value; and
- moving the movable barrier from the open position toward the closed position upon expiration of the timer.

2. The method of claim 1, further comprising:

receiving a barrier open command;

moving the movable barrier, in response to receiving the barrier open command, from the closed position to the open position;

operating the timer using a barrier timer value different than the delivery timer value; and moving the movable barrier from the open position toward the closed position upon expiration of the timer operating using the barrier timer value.

3. The method of claim 2 wherein the delivery timer value is greater than the barrier timer value.

4. The method of claim 1 wherein receiving the delivery open command includes receiving the delivery open command from a movable barrier operator server computer, the movable barrier operator system receiving the delivery open command from the movable barrier operator server computer upon receipt by the movable barrier operator server computer of a state change request from a partner server computer.

5. The method of claim 4 further comprising:

receiving a barrier open command;

moving the movable barrier from the closed position to the open position in response to receiving the barrier open command;

operating the timer using a barrier timer value different than the delivery timer value;

moving the movable barrier from the open position toward the closed position upon expiration of the timer operating using the barrier timer value; and wherein receiving the barrier open command includes receiving the barrier open command from the movable barrier operator server computer, the movable barrier operator server computer to communicate the barrier open command in response to receipt by the movable barrier operator server computer of a state change request from a remote control.

6. The method of claim 1 wherein determining the delivery timer value includes extracting the delivery timer value from the delivery open command.

7. The method of claim 1 wherein identifying the delivery timer value includes retrieving the delivery timer value from a memory of the movable barrier operator system.

8. The method of claim 1 wherein operating the timer using the delivery timer value includes:

incrementing the timer; or decrementing the timer.

9. The method of claim 1 wherein the movable barrier operator system has a barrier timer value stored in a memory of the movable barrier operator system; and wherein operating the timer using the delivery timer value includes operating the timer using the barrier timer value modified with the delivery timer value.

10. The method of claim 1 wherein the movable barrier operator system has a barrier timer value stored in a memory of the movable barrier operator system; and wherein operating the timer using the delivery timer value includes operating the timer using the delivery timer value instead of the barrier timer value.

11. The method of claim 1 wherein the movable barrier operator system has a barrier timer value stored in a memory of the movable barrier operator system;

receiving a barrier open command;

moving the movable barrier from the closed position to the open position in response to receiving the barrier open command;

operating the timer using the barrier timer value; and moving the movable barrier from the open position toward the closed position upon expiration of the timer operating using the barrier timer value.

12. The method of claim 1 further comprising determining whether a close command is received after receiving the delivery open command; and wherein moving the movable barrier upon expiration of the timer comprises moving the movable barrier upon expiration of the timer and the close command not having been received after receiving the open command.

13. The method of claim 1 wherein the delivery timer value is representative of an estimated duration of the delivery.

14. The method of claim 1 wherein the delivery open command includes the delivery timer value and a globally unique identifier of the movable barrier operator system.

15. The method of claim 1 further comprising communicating an acknowledgement of receipt of the delivery open command to a server computer.

16. The method of claim 15 wherein the acknowledgement includes the delivery timer value.

17. The method of claim 1 wherein operating the timer using the delivery timer value includes inhibiting the timer from using a barrier timer value.

18. The method of claim 1 wherein the movable barrier operator system comprises a movable barrier operator and a barrier enhancement device;

wherein receiving the open command includes the barrier enhancement device receiving the close command via a network; and wherein moving the movable barrier from the closed position to the open position comprises the barrier enhancement device transmitting a radio frequency signal to the movable barrier operator.

19. A movable barrier operator system comprising:

a motor operable to move a movable barrier between a closed position and an open position;

communication circuitry configured to receive a delivery open command;

a processor operatively connected to the motor and the communication circuitry, the processor configured to:

cause the motor to move the movable barrier from the closed position to an open position in response to the communication circuitry receiving the delivery open command;

identify a delivery timer value included as part of a payload of the delivery open command; operate a timer using the delivery timer value; and cause the motor to move the movable barrier from the open position toward the closed position upon expiration of the timer.

20. The movable barrier operator system of claim 19 wherein the processor is configured to:

receive, via the communication circuitry, a barrier open command;

operate the motor, in response to receiving the barrier open command, to move the movable barrier from the closed position to the open position;

operate the timer using a barrier timer value different than the delivery timer value; and move the movable barrier from the open position toward the closed position upon expiration of the timer operating using the barrier timer value.

21. The movable barrier operator system of claim 20 wherein the delivery timer value is larger than the barrier timer value.

22. The movable barrier operator of claim 19 wherein the communication circuitry is configured to receive the delivery open command from a movable barrier operator server computer, the movable barrier operator server system receiving the delivery open command from the movable barrier operator server computer upon receipt by the movable barrier operator server computer of a state change request from a partner server computer.

23. The movable barrier operator of claim 22 wherein the communication circuitry is configured to receive a barrier open command from the movable barrier operator server computer;

wherein the processor is configured to:

cause the motor to move the movable barrier, according to the barrier open command, from the closed position to the open position;

operate the timer using a barrier timer value different than the delivery timer value;

cause the motor to move the movable barrier from the open position to the closed position upon expiration of the timer operating using the barrier timer value; and wherein the movable barrier operator system receives the barrier open command from the movable barrier operator server computer upon receipt by the movable barrier operator server computer of a state change request from a remote control.

24. The movable barrier operator system of claim 19 wherein the processor is configured to identify the delivery timer value by extracting the delivery timer value from the open command.

25. The movable barrier operator system of claim 19 further comprising a memory configured to store the delivery timer value; and wherein the processor is configured to identify the delivery timer value by retrieving the delivery timer value from the memory.

26. The movable barrier operator system of claim 19 wherein the processor is configured to operate the timer using the delivery timer value by:

incrementing the timer; or decrementing the timer.

27. The movable barrier operator system of claim 19 further comprising a memory configured to store a barrier timer value; and wherein the processor is configured to operate the timer using the delivery timer value by using the barrier timer value modified with the delivery timer value.

28. The movable barrier operator system of claim 19 further comprising a memory configured to store a barrier timer value; and wherein the processor is configured to operate the timer using the delivery timer value instead of the barrier timer value.

29. The movable barrier operator system of claim 28 further comprising a user interface operable to receive the barrier timer value.

30. The movable barrier operator system of claim 19 further comprising a memory to store a barrier timer value;

wherein the processor is configured to:

receive, via the communication circuitry, a barrier open command;

cause the motor to move the movable barrier from the closed position to the open position in response to receiving the barrier open command;

retrieve the barrier timer value from the memory;

operate the timer using the barrier timer value; and move the movable barrier from the open position toward the closed position upon expiration of the timer operating using the barrier timer value.

31. The movable barrier operator system of claim 19 wherein the processor is configured to determine whether the communication circuitry has received a close command after receiving the delivery open command;

wherein the processor is configured to cause the motor to move the movable barrier from the open position to the closed position upon expiration of the timer and the communication circuitry not receiving a close command after receiving the delivery open command.

32. The movable barrier operator system of claim 19 wherein the delivery timer value is representative of an estimated duration of a delivery.

33. The movable barrier operator system of claim 19 wherein the delivery open command includes the delivery timer value and a globally unique identifier of the movable barrier operator system.

34. The movable barrier operator system of claim 19 wherein the processor is configured to control the communication circuitry to communicate an acknowledgement of receipt of the delivery open command to a server computer.

35. The movable barrier operator system of claim 34 wherein the acknowledgement includes the delivery timer value.

36. The movable barrier operator system of claim 19 wherein the processor is configured to operate the timer using the delivery timer value including inhibiting the timer from using a barrier timer value.

37. The movable barrier operator system of claim 19 wherein the movable barrier operator system comprises:

a movable barrier operator comprising the motor; and an operator enhancement device comprising the processor and the communication circuitry.

* * * * *